US010074286B2

(12) United States Patent
Hayakawa

(10) Patent No.: US 10,074,286 B2
(45) Date of Patent: Sep. 11, 2018

(54) TRAFFIC CONTROL TRAINING SCENARIO GENERATION APPARATUS, TRAFFIC CONTROL TRAINING APPARATUS, AND TRAFFIC CONTROL TRAINING SCENARIO GENERATION PROGRAM

(71) Applicant: SUBARU CORPORATION, Tokyo (JP)

(72) Inventor: Masahito Hayakawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 27 days.

(21) Appl. No.: 14/952,765

(22) Filed: Nov. 25, 2015

(65) Prior Publication Data

US 2016/0155343 A1 Jun. 2, 2016

(30) Foreign Application Priority Data

Nov. 27, 2014 (JP) ................. 20014-239701

(51) Int. Cl.
 *G09B 19/14* (2006.01)
 *G09B 5/06* (2006.01)
(52) U.S. Cl.
 CPC ............... *G09B 5/06* (2013.01); *G09B 19/14* (2013.01)
(58) Field of Classification Search
 CPC ....................................... G09B 19/14
 USPC ........................................ 434/220
 See application file for complete search history.

(56) References Cited

U.S. PATENT DOCUMENTS

| 4,979,137 | A | * | 12/1990 | Gerstenfeld | ............ | G01S 13/91 434/220 |
| 2004/0225416 | A1 | * | 11/2004 | Kubota | ............... | B60R 16/0231 701/1 |
| 2007/0192118 | A1 | * | 8/2007 | Bukovec | ................ | G06Q 10/06 345/441 |
| 2014/0248588 | A1 | * | 9/2014 | Williams | ............... | G09B 9/006 434/47 |
| 2014/0308646 | A1 | * | 10/2014 | Wurth | ....................... | G09B 7/04 434/350 |

FOREIGN PATENT DOCUMENTS

JP  11-184366 A  7/1999
JP  2000-267555 A  9/2000
(Continued)

*Primary Examiner* — Thomas Hong
(74) *Attorney, Agent, or Firm* — McDermott Will & Emery LLP

(57) ABSTRACT

A traffic control training scenario generation apparatus generates a training scenario for traffic control communication. The apparatus includes: a display unit and a display control unit that performs display control of the display unit. The display control unit displays on the display unit form generation buttons that respectively correspond to setting forms to set processings including voice input receiving processing and voice output processing in the training scenario, displays on the display unit one of the setting form corresponding to one of the form generation buttons when the form generation button is operated by a user, and displays on the display unit a connection line connecting between the multiple setting forms when an operation is performed by a user to cause processing in the training scenario to proceed between multiple ones of the setting forms displayed on the display unit.

19 Claims, 6 Drawing Sheets

(56) References Cited

FOREIGN PATENT DOCUMENTS

| JP | 2000-347558 A | 12/2000 |
| JP | 2004-054300 A | 2/2004 |
| JP | 2004-212238 A | 7/2004 |
| JP | 2012-018476 A | 1/2012 |

* cited by examiner

… (1)

TRAFFIC CONTROL TRAINING SCENARIO GENERATION APPARATUS, TRAFFIC CONTROL TRAINING APPARATUS, AND TRAFFIC CONTROL TRAINING SCENARIO GENERATION PROGRAM

CROSS-REFERENCE TO RELATED APPLICATIONS

The present application claims priority from Japanese Patent Application No. 2014-239701 filed on Nov. 27, 2014, the entire contents of which are hereby incorporated by reference.

BACKGROUND

1. Technical Field

The present disclosure relates to a traffic control training scenario generation apparatus, a traffic control training apparatus, and a traffic control training scenario generation program that are used training of traffic control communication.

2. Related Art

Traffic control communication, represented by air traffic control, between a pilot of an airplane and an air traffic controller needs to be performed accurately and quickly in the operation of the traffic system. Thus, mainly for controllers, a training apparatus has been proposed that can perform simulated traffic control communication according to a predetermined training scenario (see, for instance, Japanese Unexamined Patent Application Publication No. 2000-347558 and Japanese Unexamined Patent Application Publication No. 2004-212238).

SUMMARY OF THE INVENTION

However, in the above-mentioned related art, the training scenario is basically incorporated in a program of an apparatus. Therefore, editing the training scenario is possible within a range pre-set in the program, but may not be freely performed by a user who is not proficient in programming. In other words, it is difficult for a user to generate a desired training scenario.

It is desirable to make it possible to generate a training scenario of traffic control communication easily compared with related art.

A first aspect of the present disclosure provides a traffic control training scenario generation apparatus that generates a training scenario for traffic control communication. The traffic control training scenario generation apparatus includes: a display unit; a display control unit that performs display control of the display unit. The display control unit displays on the display unit a plurality of types of form generation buttons that correspond to a plurality of types of setting forms to set a plurality of types of processing including voice input receiving processing and voice output processing in the training scenario, displays on the display unit one of the setting forms corresponding to one of the form generation buttons when the form generation button is operated by a user, and displays on the display unit a connection line connecting between the multiple setting forms when an operation is performed by a user to cause processing in the training scenario to proceed between multiple ones of the setting forms displayed on the display unit.

The types of setting forms may include an input form to set voice input receiving processing in the training scenario, and an interrupt setting form to set in the training scenario interrupt processing that, during execution of processing in the input form, interrupts the processing and receives a voice input.

A second aspect of the present disclosure provides a traffic control training apparatus including the traffic control training scenario generation apparatus, a voice input unit, and a voice output unit.

The types of setting forms may include an input form and an output form to set voice input receiving processing and voice output processing in the training scenario, and the input form and the output form have respective start buttons to start execution of the training scenario from the respective forms.

The traffic control training apparatus may further include a storage unit that stores an identification number of a setting form for which processing is performed when the training scenario is executed. The setting forms displayed on the display unit have mutually different identification numbers.

The traffic control training apparatus may be operated in conjunction with a real-time simulator.

A third aspect of the present disclosure provides a traffic control training scenario generation program that generates a training scenario for traffic control communication, the traffic control training scenario generation program causing a computer including a display unit to implement: a function of displaying on the display unit a plurality of types of form generation buttons that correspond to a plurality of types of setting forms to set a plurality of types of processing including voice input receiving processing and voice output processing in the training scenario; a function of displaying on the display unit one of the setting forms corresponding to one of the form generation buttons when the form generation button is operated by a user, and a function of displaying on the display unit a connection line connecting between the multiple setting forms when an operation is performed by a user to cause processing in the training scenario to proceed between multiple ones of the setting forms displayed on the display unit.

DETAILED DESCRIPTION

Figure 1:
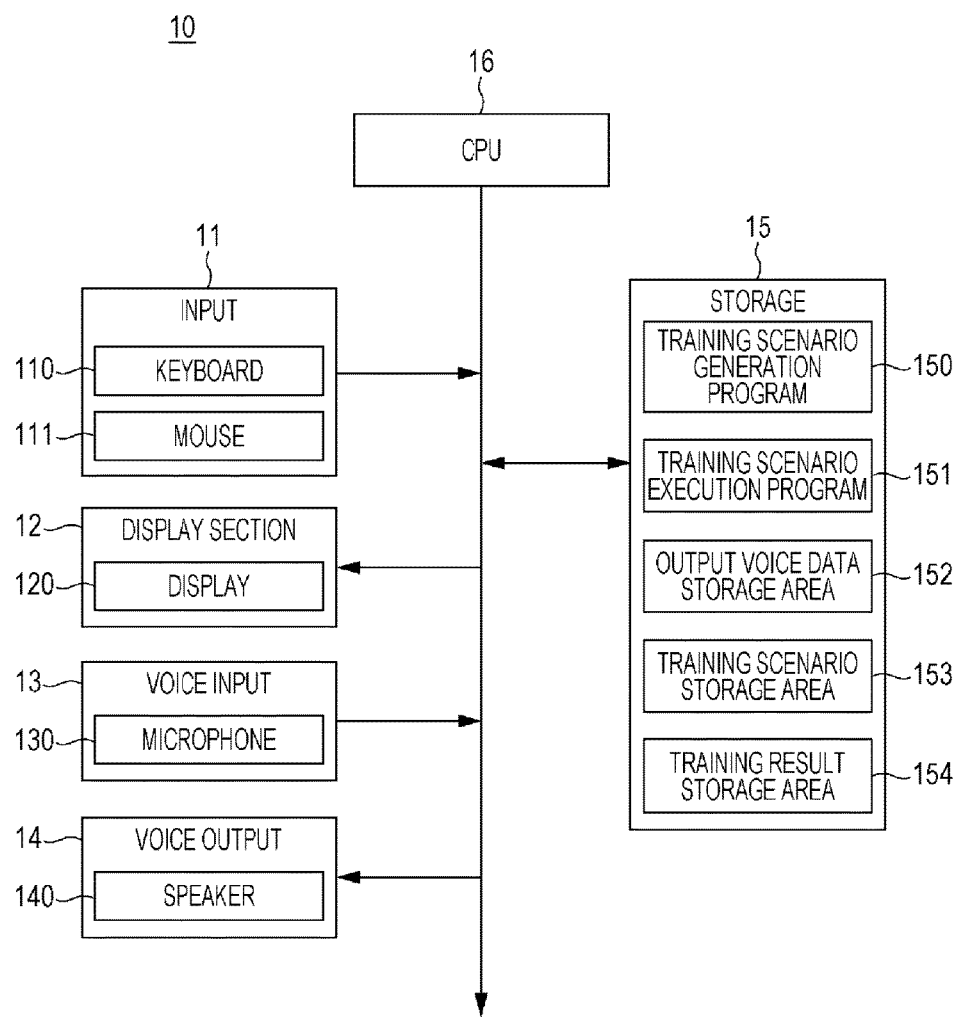
FIG. 1 is a block diagram illustrating the functional configuration of a traffic control training apparatus.

Hereinafter, an implementation of the present disclosure will be described with reference to the drawings.
[Configuration]
First, the configuration of a traffic control training apparatus 10 in the present implementation will be described. FIG. 1 is a block diagram illustrating the functional configuration of the traffic control training apparatus 10.

The traffic control training apparatus 10 generates a training scenario for traffic control communication and performs training using the generated training scenario. In the present implementation, particularly for air traffic control, the traffic control training apparatus 10 is provided for the training of pilots of airplanes and/or air traffic controllers.

Specifically, as illustrated in FIG. 1, the traffic control training apparatus 10 includes an input 11, a display section 12, a voice input 13, a voice output 14, a storage 15, and a central processing unit (CPU) 16, and these components are configured to be data communicatively connected to each other via a bus.

The input 11 includes a keyboard 110 having a key group (not illustrated) and a mouse 111 which is a pointing device, and outputs a signal to the CPU 16, the signal corresponding to the position of a pressed key on the keyboard 110 or a user operation with the mouse 111. The display section 12 includes a display 120, and displays a variety of information on the display 120 based on a display signal inputted from the CPU 16.

The voice input 13 includes a microphone 130, and picks up the voice uttered by a user from the microphone 130 based on a voice input signal inputted from the CPU 16 and stores the voice (records) in the storage 15. The voice output 14 includes a speaker 140, and outputs a voice from the speaker 140 based on a voice output signal inputted from the CPU 16.

The storage 15 is a memory that stores programs and data for implementing various functions of the traffic control training apparatus 10 and that serves as a work area for the CPU 16. In the present implementation, the storage 15 has a training scenario generation program 150 and a training scenario execution program 151.

The training scenario generation program 150 is a program that causes the CPU 16 to execute the later-described training scenario generation processing (see FIG. 2). The training scenario execution program 151 is a program that causes the CPU 16 to execute the later-described training scenario execution processing in which a training scenario generated by the training scenario generation processing is executed.

Also, the storage 15 has an output voice data storage area 152, a training scenario storage area 153, and a training result storage area 154. The output voice data storage area 152 is a memory area that stores output voice data for outputting a voice from the voice output 14. The training scenario storage area 153 is a memory area that stores a training scenario that is generated by the training scenario generation processing. The training result storage area 154 is a memory area that stores a training result at the time of training scenario execution, and as described later, stores the route of a training scenario followed by a trainee and a time taken in addition to the voice of a trainee at the time of training scenario execution.

The CPU 16 performs processing based on a predetermined program according to an inputted instruction, and sends an instruction or transfers data to each functional unit to control the traffic control training apparatus 10 comprehensively. Specifically, the CPU 16 reads one of various programs stored in the storage 15 according to an operation signal inputted from the input 11, and performs processing in accordance with the program. The CPU 16 then temporarily stores a processing result in the storage 15 and outputs the processing result to the display section 12 as needed.

[Operation of Training Scenario Generation Processing]

Figure 3A:
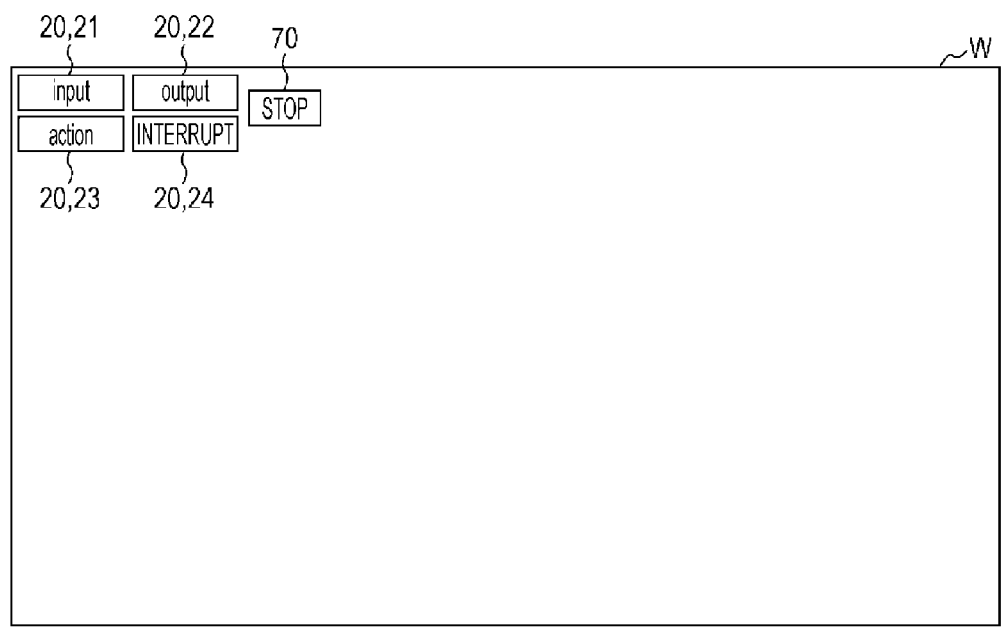
FIG. 3A is a diagram illustrating the initial state of a system generation window.
Figure 3B:
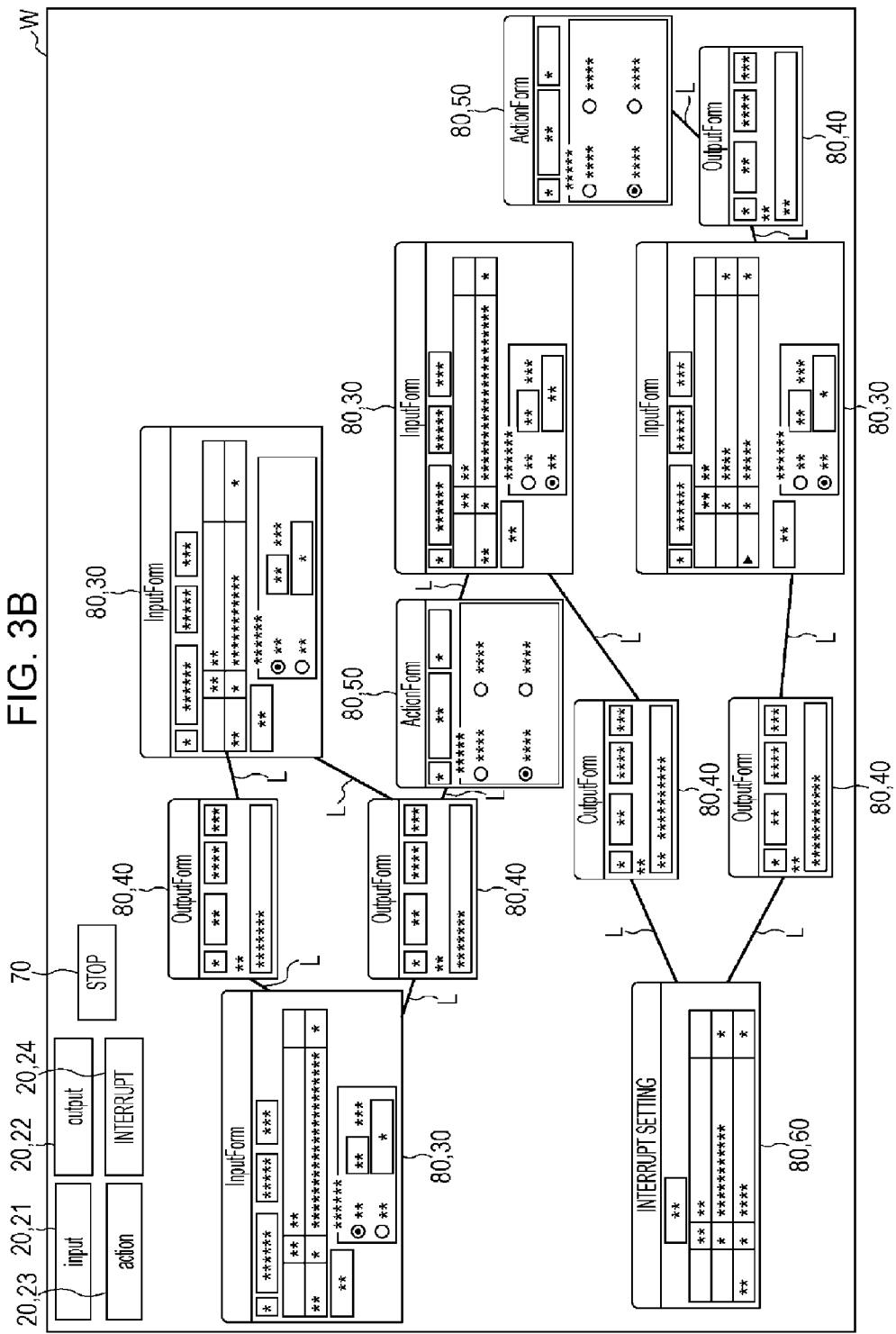
FIG. 3B is a diagram illustrating an example of completed state of a training scenario in training scenario generation processing.
Figure 4A:
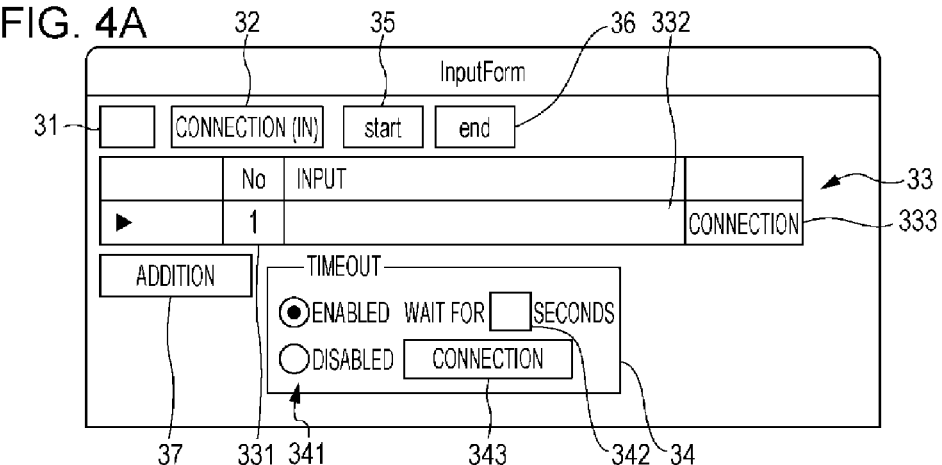
FIG. 4A is a diagram illustrating an input form.
Figure 4B:
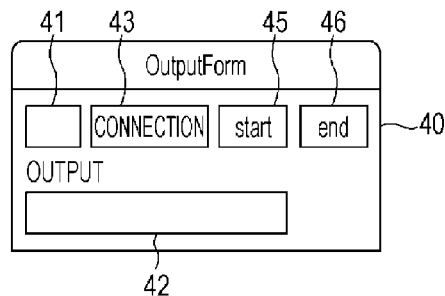
FIG. 4B is a diagram illustrating an output form.

Next, the operation of the traffic control training apparatus 10 when executing training scenario generation processing will be described with reference to FIG. 2 to FIG. 4D. FIG. 2 is a flow chart illustrating the flow of training scenario generation processing, FIG. 3A is a diagram illustrating the initial state of the later-described scenario generation window W, and FIG. 3B is a diagram illustrating an example of completed state of a training scenario in training scenario generation processing. Also, FIGS. 4A to 4B are diagrams illustrating the later-described input form 30, output form 40, action form 50, and interrupt setting form 60. It is to be noted that in the following description, "user" indicates an individual who generates a training scenario, and "trainee" indicates an individual who receives training at the time of training scenario execution.

Training scenario generation processing is processing in which a training scenario for traffic control communication is generated based on a user operation. The training scenario generation processing is executed such that when an instruction to execute the training scenario generation processing is inputted by a user operation, the CPU 16 reads a training scenario generation program 150 from the storage 15 and executes the training scenario generation program 150.

Figure 2:
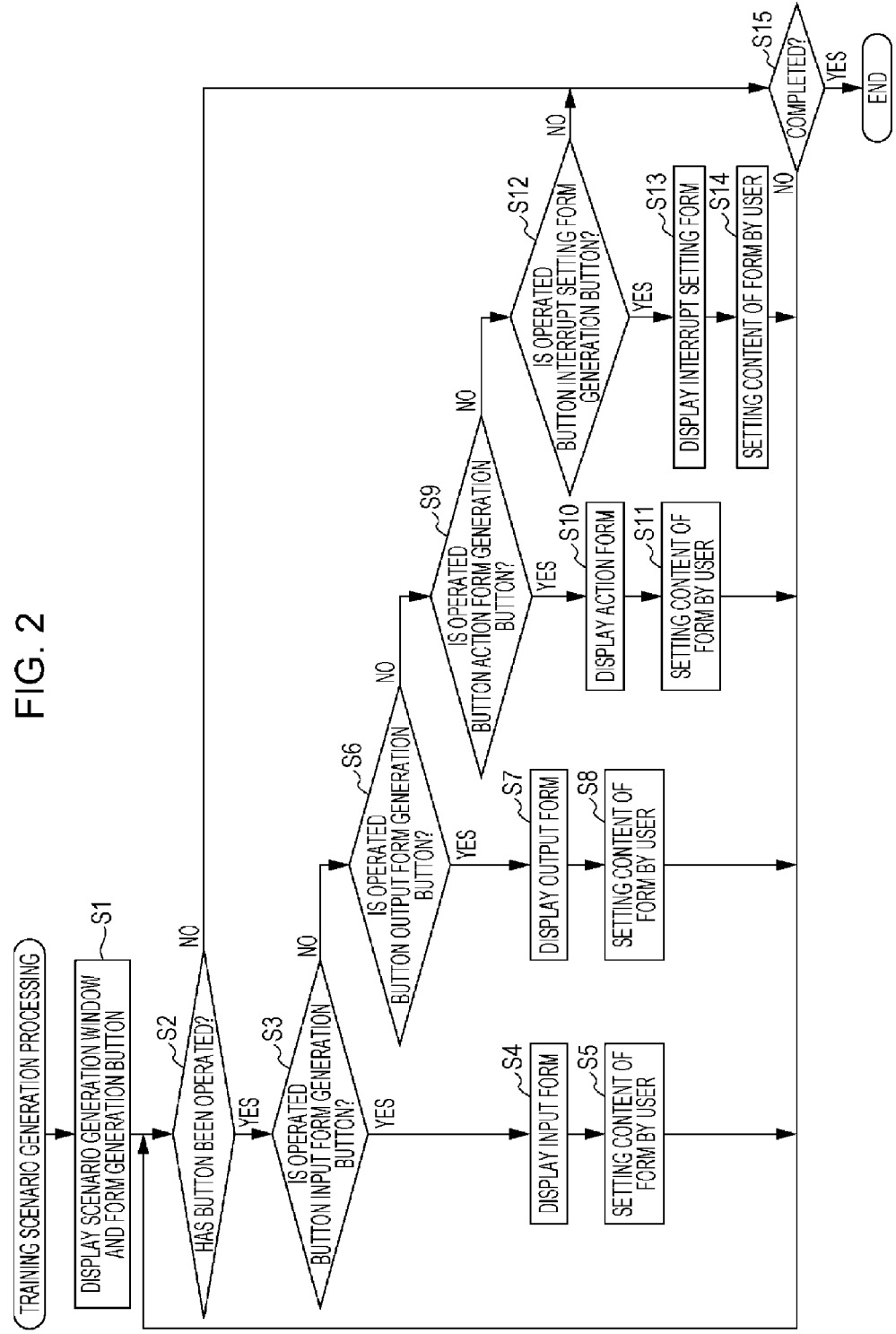
FIG. 2 is a flow chart illustrating the flow of training scenario generation processing.

As illustrated in FIG. 2, when the training scenario generation processing is performed, the CPU 16 first displays the scenario generation window W and a plurality of form generation buttons 20 on the display 120 (step S1). Specifically, the CPU 16 displays the scenario generation window W in a slightly large size on the display 120, and collectively displays a plurality of types of form generation buttons 20 in the corner of the scenario generation window W (FIG. 3A). As describes later, the plurality of types of form generation buttons 20 are buttons for generating the plurality of types of setting form 80 that correspond the plurality of types of form generation buttons 20. In the present implementation, the plurality of types of form generation buttons 20 include an input form generation button 21, an output form generation button 22, an action form generation button 23, and an interrupt setting form generation button 24. In the collective display, the CPU 16 displays a state display window 70, which indicates an execution state of a training scenario, in the scenario generation window W. In the state display window 70, when a training scenario is executed, the identification number of a setting form 80 during execution of processing is displayed, and when a training scenario is not executed, "stop" is displayed.

Next, the CPU 16 determines whether or not any one of the form generation buttons 20 in the scenario generation window W is operated by a user (step S2). When it is determined that none of the form generation buttons 20 is operated (No in step S2), processing proceeds to step 15 described later.

When it is determined that one of the form generation buttons 20 is operated (Yes in step S2) in step S2, the CPU 16 determines whether or not the operated form generation button 20 is the input form generation button 21 (step S3). When it is determines that the operated form generation button 20 is the input form generation button 21 (Yes in step S3), the CPU 16 displays input form 30 in the scenario generation window W, the input form 30 corresponding to the input form generation button 21 (step S4).

The input form 30 is a setting form 80 for setting "voice input receiving processing", by which voice input is received from a trainee, during execution of a training scenario. As illustrated in FIG. 4A, the input form 30 has a number display column 31, a connection source setting button 32, an input voice setting field 33, a timeout setting field 34, a start button 35, and a stop button 36. Among these, the number display field 31 is a field in which the identification number of the input form 30 is displayed. The identification number is one of common serial numbers that are automatically set in all the setting form 80 except for the interrupt setting form 60, for instance, according to the order in which the form generation button 20 is operated by a user.

The connection source setting button 32 is a button for connecting another setting form 80 and the input form 30 so that processing proceeds from the another setting form 80 to the input form 30 at the time of training scenario execution. After a connection setting button (the later-described connection setting buttons 43, 53) of another setting form 80 is operated by a user, the connection source setting button 32 is operated, and the another setting form 80 as a proceeding source of processing is thereby connected to the input form 30. When the connection operation is performed, the CPU 16 displays a linear connection line L between the connected input form 30 and the another setting form 80 in the scenario generation window W to indicate the established connection between these (see FIG. 3B).

The input voice setting field 33 is a field in which the content of the voice to be inputted by a trainee at the time of training scenario execution is set. The input voice setting field 33 is presented in list form in which mutually associated number field 331, voice content field 332, and connection destination setting button 333 are arranged in each row. The number field 331 is a field in which the identification number (serial number from the upper row) of each row is automatically set and displayed.

The voice content field 332 is a field that receives setting of voice content by a user and the voice content is input in the field in text format. It is to be noted that inputting, for instance, "¥n1¥" in the voice content field 332 allows a variable based on the voice of a trainee to be assigned to the character string sandwiched by two "¥". Furthermore, when a variable is already assigned to the character string sandwiched by two "$", inputting, for instance, "$n1$" in the voice content field 332 allows voice input of the variable to be received.

The connection destination setting button 333 is a button to connect another setting form 80 to the input form 30, the another setting form 80 being a destination to which processing proceeds when the voice content of the associated voice content field 332 is inputted by a trainee at the time of training scenario execution. After the connection destination setting button 333 is operated by a user, the connection setting button (the later-described connection setting buttons 43, 53) of another setting form 80 to be connected desirably is operated, and the another setting form 80 as a proceeding destination of processing is thereby connected to the input form 30. When the connection operation is performed, the CPU 16 displays the linear connection line L that connects between the input form 30 for which the connection operation is performed and the another setting form 80 in the scenario generation window W and the CPU 16 displays the identification number of the another setting form 80 on the connection destination setting button 333 (see FIG. 5).

In addition, the input form 30 has a setting field addition button 37 and an operation of the setting field addition button 37 causes a new row (that is, new number field 331, voice content field 332, and connection destination setting button 333) to be added to the input voice setting field 33. That is, multiple rows are provided in the input voice setting field 33 by a user and the respective voice content fields 332 and connection destination setting buttons 333 are set to mutually different voice contents and proceeding destinations of processing, thereby making it possible to branch a route for training scenario by the input form 30.

The timeout setting field 34 is a field for providing time out setting in the voice input receiving state of the input form 30 at the time of training scenario execution. Specifically, the timeout setting field 34 has radio buttons 341 for enabling or disabling time out setting, a reception time setting field 342 in which a reception time is set when time out setting is enabled, and a connection destination setting button 343 for setting another setting form 80 to which processing proceeds when time out occurs. It is to be noted that the connection destination setting button 343 functions similarly to the connection destination setting button 333 in the input voice setting field 33 described above. The start button 35 and the stop button 36 are buttons for starting execution of a training scenario from the input form 30 or stopping the execution in the input form 30.

Next, as illustrated in FIG. 2, the CPU 16, after receiving a content setting operation of a user for the input form 30 displayed in step S4 (step S5), processing proceeds to the above-described step S2. In step S5, a user operates each field of the input form 30 and/or buttons to set desired details of voice input.

Also, when it is determined that the form generation button 20 operated by a user is not the input form generation button 21 in step S3 described above (No in step S3), the CPU 16 determines whether or not the operated form generation button 20 is the output form generation button 22 (step S6). When it is determined that the operated form generation button 20 is the output form generation button 22 (Yes in step S6), the CPU 16 displays the output form 40 corresponding to the output form generation button 22, in the scenario generation window W (step S7).

The output form 40 is the setting form 80 for setting "voice output processing" that causes voice to be outputted from the voice output 14 in a training scenario. As illustrated in FIG. 4B, the output form 40 has a number display field 41, an output voice setting field 42, a connection setting button 43, a start button 45, and a stop button 46. Among these, the number display field 41 is a field in which the identification number of the output form 40 is displayed similarly to the number display field 31 in the input form 30 described above.

The output voice setting field 42 is a field in which the content of the voice to be outputted from the voice output 14 is set at the time of training scenario execution, and setting (text input) of voice content by a user is received by the field. Also, similarly to the voice content field 332 of the input form 30 described above, when a variable is already assigned to the character string sandwiched by two "$", inputting, for instance, "$n1$" in the output voice setting field 42 allows voice output of the variable to be performed.

The connection setting button 43 is a button for connecting the output form 40 and another setting form 80 so that processing continues between the output form 40 and the another setting form 80 at the time of training scenario execution. The connection setting button 43 is operated continuously to connection setting buttons (the connection source setting button 32, the connection destination setting buttons 333, 343, the later-described connection setting button 53, connection destination setting button 613) of another setting form 80, and thus the output form 40 and the another setting forms 80 are connected where processing of a first operated setting form 80 is performed first. The start button 45 and the stop button 46 are buttons for starting execution of a training scenario from the output form 40 or stopping the execution in the output form 40.

Next, as illustrated in FIG. 2, the CPU 16, after receiving a content setting operation of a user for the output form 40 displayed in step S7 (step S8), processing proceeds to the above-described step S2. In step S8, a user operates the output voice setting field 42, the connection setting button 43 of the output form 40 and others to set desired details of voice output.

Also, when it is determined that the form generation button 20 operated by a user is not the output form generation button 22 in step S6 described above (No in step S6), the CPU 16 determines whether or not the operated form generation button 20 is the action form generation button 23 (step S9). When it is determined that the operated form generation button 20 is the action form generation button 23 (Yes in step S9), the CPU 16 displays the action form 50 corresponding to the action form generation button 23, in the scenario generation window W (step S10).

Figure 4C:
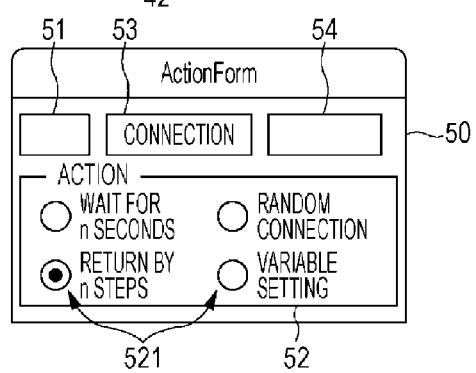
FIG. 4C is a diagram illustrating an action form.

The action form 50 is the setting form 80 for setting "operational processing" in the training scenario, that performs various operations except for voice input/output. As illustrated in FIG. 4C, the action form 50 has a number display field 51, an action setting field 52, and a connection setting button 53. Among these, the number display field 51 is a field in which the identification number of the action form 50 is displayed similarly to the number display field 31 in the input form 30 described above.

The action setting field 52 is a field in which operation content to be performed in the action form 50 at the time of training scenario execution is set, and in the present implementation, four types of operations may be selected by radio buttons 521. Specifically, in the action setting column 52 of the present implementation, selection may be made from "wait for n seconds" operation that sets on stand-by for a designated time, "return by n steps" operation that causes processing to proceed back to the setting form 80 by a designated number in the training scenario, "random connection" operation that causes processing to proceed to randomly selected one of a plurality of pre-designated setting forms 80, and "variable setting" in which a variable used in voice input processing or voice output processing is pre-set. Here, the designated number "n" in the "wait for n seconds" operation or the "return by n steps" operation can be set in designated number setting field 54 in the action form 50. Also, a plurality of pre-designated setting forms 80 in the "random connection" operation and pre-set variables in the "variable setting" are designated or set in an auxiliary window (not illustrated) which is displayed when the radio buttons 521 for those operations are operated.

The connection setting button 53 is a button for connecting the action form 50 and another setting form 80 so that processing continues between the action form 50 and the another setting form 80 at the time of training scenario execution. The connection setting button 53 functions similarly to the connection setting button 43 of the output form 40 described above.

Next, as illustrated in FIG. 2, the CPU 16, after receiving a content setting operation of a user for the action form 50 displayed in step S10 (step S11), processing proceeds to the above-described step S2. In step S11, a user operates each field of the action form 50 and/or buttons to set desired details of operation.

Also, when it is determined that the form generation button 20 operated by a user is not the action form generation button 23 in step S9 described above (No in step S9), the CPU 16 determines whether or not the operated form generation button 20 is the interrupt setting form generation button 24 (step S12). When it is determined that the operated form generation button 20 is the interrupt setting form generation button 24 (Yes in step S12), the CPU 16 displays the interrupt setting form 60 corresponding to the interrupt setting form generation button 24, in the scenario generation window W (step S13).

Figure 4D:
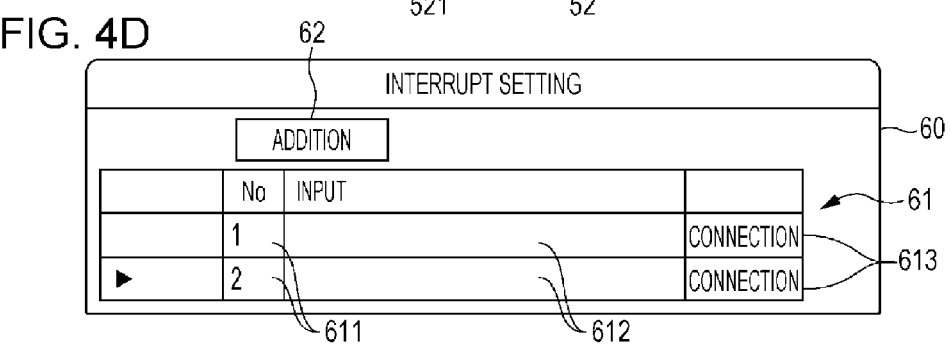
FIG. 4D is a diagram illustrating an interrupt setting form.

The interrupt setting form 60 is the setting form 80 for setting "interrupt processing" in a training scenario, and the interrupt processing, during execution of processing (voice input receiving processing) of an input form 30, interrupts the processing and receives voice input. In other words, the interrupt setting form 60 is for setting voice input processing which has the content in common with all input forms 30. As illustrated in FIG. 4D, the interrupt setting form 60 has an input voice setting field 61 and a setting field addition button 62. The input voice setting field 61 is formed in the same manner as the input voice setting field 33 of the input form 30 described above. That is, the input voice setting field 61 is presented in list form in which mutually associated number field 611, voice content field 612, and connection destination setting button 613 are arranged in each row, which are formed in the same manner as the number field 331, the voice content field 332, and the connection destination setting button 333 of the input form 30. The setting field addition button 62 is formed in the same manner as the setting field addition button 37 of the input form 30 described above, and an operation of the setting field addition button 62 causes a new row to be added to the input voice setting field 61.

Next, as illustrated in FIG. 2, the CPU 16 receives a content setting operation of a user for the interrupt setting form 60 displayed in step S13 (step S14). In step S14, a user operates the input voice setting field 61, the setting field addition button 62 of the interrupt setting form 60 and others to set desired details of interrupt processing.

Also, when it is determined that the form generation button 20 operated by a user is not the interrupt setting form generation button 24 in step S12 described above (No in step S12), the CPU 16 determines whether or not a termination operation of the training scenario generation processing is performed by a user (step S15). When it is determined that a termination operation of the training scenario generation processing is not performed by a user (No in step S15), processing of the CPU 16 proceeds to step S2 described above. When it is determined that a termination operation of the training scenario generation processing is performed by a user (Yes in step S15), the CPU 16 stores the generated training scenario in the training scenario storage area 153 and terminates the training scenario generation processing. It is to be noted that the CPU 16 is designed to temporarily store a training scenario in process of generation in the storage 15 also during execution of training scenario generation processing.

In this manner, for instance, as illustrated in FIG. 3B, various types of setting forms 80 are disposed and connected on the scenario generation window W as needed by a user, and each content is set and a training scenario is thereby generated. Thus, in the training scenario generation processing in the present implementation, a user can generate a training scenario by utilizing a graphical user interface (GUI) such as various types of form generation buttons 20 and setting forms 80, and thus it is possible to generate a training scenario while visually recognizing the training scenario without needing the knowledge of a programming language.

[Operation of Training Scenario Execution Processing]

Figure 5:
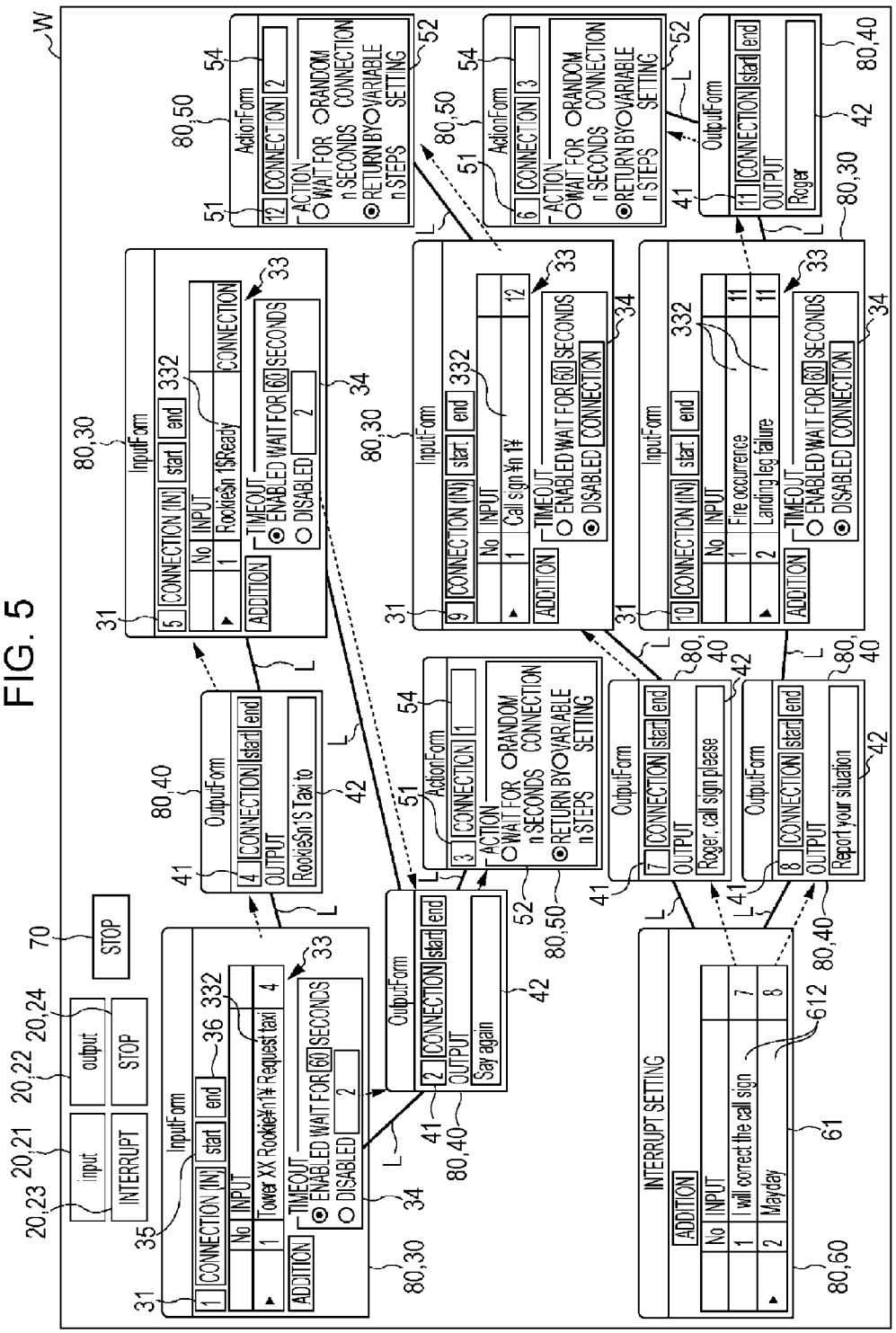
FIG. 5 is a diagram illustrating an example of a training scenario for pilots of airplanes, generated by the training scenario generation processing.

Next, the operation of training scenario execution processing, executed by the traffic control training apparatus 10 will be described with reference to FIG. 5. FIG. 5 is a diagram illustrating an example of a training scenario for pilots of airplanes, generated in the scenario generation window W by the training scenario generation processing. It is to be noted that dashed line arrows in FIG. 5 illustrate the flow of processing in a training scenario in an easily understandable manner and are not displayed practically.

The training scenario execution processing is processing that executes a training scenario generated by training scenario generation processing. The training scenario execution processing is executed such that when an instruction to execute the training scenario execution processing is inputted by a user operation, the CPU 16 reads a training scenario execution program 151 from the storage 15 and executes the training scenario execution program 151.

After the training scenario execution processing is executed, when a training scenario is designated by a trainee, the training scenario is read from the training scenario storage area 153 and is executed. It is to be noted that the training scenario is temporarily stored in the storage 15 even during training scenario generation processing and an operation of the start buttons 35, 45 of the input form 30 or the output form 40 allows the training scenario to be executed at any time, which are as described above. Hereinafter, an operation example will be described in the case where a trainee performs training by executing the training scenario illustrated in FIG. 5 by him/herself.

Operation Example 1

As illustrated in FIG. 5, first when a trainee operates the start button 35 of the input form 30 with the identification number "1", the CPU 16 starts execution of a training scenario from the input form 30, and executes voice input receiving processing in the input form 30. Here, when a trainer utters "tower XX rookie 777 request taxi . . . ", the CPU 16 picks up the voice from the microphone 130 and determines whether or not the voice matches the voice content of the input voice setting field 33 of the input form 30. When it is determined that the utterance content of the trainee matches the voice content of the input voice setting field 33, the CPU 16 causes processing to proceed to the output form 40 with the identification number "4" which is set as the proceeding destination of processing in the input voice setting field 33. At this point, the voice content field 332 of the input voice setting field 33 of the input form 30 has an input of " . . . rookie ¥n1¥ request . . . ", and thus the CPU 16 assigns number "777" uttered by the trainee to character string "n1" to recognize "n1".

Next, the CPU 16 executes voice output processing in the output form 40 with the identification number "4", and outputs the voice "Rookie 777 taxi to runway . . . " from the speaker 140. At this point, the output voice setting field 42 of the output form 40 has an input of "Rookie $n1$ taxi to . . . ", and as described above, the number "777" is assigned to the character string "n1" at this moment, and thus the CPU 16 replaces the character string "n1" by the number "777" and outputs the voice.

Next, the CPU 16 causes processing to proceed from the output form 40 with the identification number "4" to the input form 30 with the identification number "5", and executes voice input receiving processing in the input form 30. Here, when a trainer does not utter properly for more than 60 seconds which is set in the timeout setting field 34, the CPU 16 enables timeout setting and causes processing to proceed to the output form 40 with the identification number "2" which is set as the proceeding destination of processing at the time of timeout in the timeout setting field 34.

The CPU 16 then executes voice output processing in the output form 40 with the identification number "2", causes the speaker 140 to output "Say again", a voice to prompt utterance again, then causes processing to proceed to the action form 50 with the identification number "3". In the action form 50, "return by 1 step" operation processing is executed on the route up to the present, and the CPU 16 causes processing to proceed back to the input form 30 with the identification number "5" by 1 step from the output form 40 with the identification number "2" which is the setting form 80 immediately before the action form 50. The CPU 16 then executes voice input receiving processing in the input form 30.

Also, when a trainer operates the start button 35 of the input form 30 with the identification number "1" and executes voice input receiving processing in the input form 30, if the trainer does not utter properly for more than 60 seconds which is set in the timeout setting field 34, the CPU 16 enables timeout setting and causes processing to proceed to the output form 40 with the identification number "2" which is set as the proceeding destination of processing at the time of timeout in the timeout setting field 34.

The CPU 16 then executes voice output processing in the output form 40 with the identification number "2", causes the speaker 140 to output "Say again", a voice to prompt utterance again, then causes processing to proceed to the action form 50 with the identification number "3". In the action form 50, "return by 1 step" operation processing is executed on the route up to the present, and the CPU 16 causes processing to proceed back to the input form 30 with the identification number "1" by 1 step from the output form 40 with the identification number "2" which is the setting form 80 immediately before the action form 50. The CPU 16 then executes voice input receiving processing in the input form 30.

Also, at the time of training scenario execution, the CPU 16 stores one after another to the training result storage area 154, the identification number of the setting form 80 in which processing is executed, in addition to the voice of a trainee and a time taken. It is possible to recognize the route followed by a trainee in the training scenario due to the storage of the identification number, and proficiency of the trainee can be evaluated based on the degree of deviation from a model route, for instance. It is to be noted that when processing is executed in the interrupt setting form 60 having no identification number, an identification number (for instance, "0") which is not assigned in another setting forms 80 is designed to be stored in the training result storage area 154.

Operation Example 2

Next, an operation example when interrupt processing is executed will be described. When a trainee utters "I will correct the call sign" during execution of processing in the input form 30 with the identification number "5" described above, the CPU 16 picks up the voice from the microphone 130. Subsequently, the CPU 16, when determining that the utterance content does not match the voice content of the input voice setting field 33 of the input form 30, determines whether or not the utterance content matches any of the voice content of the input voice setting field 61 of the interrupt setting form 60. When it is determined that the utterance content of a trainee matches one of the voice content of the input voice setting field 61, the CPU 16 causes processing to proceed to the output form 40 with the identification number "7" which is set as the proceeding destination of processing in the input voice setting field 61.

Next, the CPU 16 executes voice output processing in the output form 40 with the identification number "7", and outputs the voice "Roger, call sign please" from the speaker 140, then causes processing to proceed to the input form 30 with the identification number "9". Here, when a trainer utters "Call sign 888" that matches the voice content of the input voice setting field 33 of the input form 30, the CPU 16 causes processing to proceed to the action form 50 with the identification number "12" which is set as the proceeding destination of processing in the input voice setting field 33. At this point, the voice content field 332 of the input voice setting field 33 of the input form 30 has an input of "Call sign ¥n1¥", and thus, instead of the number "777" which is already assigned to the character string "n1", the CPU 16 assigns new number "888" uttered by a trainee to the character string "n1" to recognize "n1".

Next, the CPU 16 executes "return by 2 steps" operation processing, which is set in the action form 50 with the identification number "12", on the route up to the present, and causes processing to proceed back to the setting form 80 by 2 steps from the input form 30 with the identification number "9" which is the setting form 80 immediately before the action form 50. Then, processing proceeds to the interrupt setting form 60. However, in the interrupt setting form 60, interrupt processing is performed during execution of processing of the input form 30 with the identification number "5" which is to be originally performed, and thus the CPU 16 causes processing to proceed not to the interrupt setting form 60 itself but to the input form 30 with the identification number "5".

Operation Example 3

Next, an another operation example when interrupt processing is executed will be described. When a trainee utters "Mayday" during execution of processing in the input form 30 with the identification number "1" described above, the CPU 16 picks up the voice from the microphone 130. Subsequently, the CPU 16, when determining that the utterance content does not match the voice content of the input voice setting field 33 of the input form 30, determines whether or not the utterance content matches any of the voice content of the input voice setting field 61 of the interrupt setting form 60. When it is determined that the utterance content of a trainee matches one of the voice content of the input voice setting field 61, the CPU 16 causes processing to proceed to the output form 40 with the identification number "8" which is set as the proceeding destination of processing in the input voice setting field 61.

Next, the CPU 16 executes voice output processing in the output form 40 with the identification number "8", and outputs the voice "Report your situation" from the speaker 140, then causes processing to proceed to the input form 30 with the identification number "10". Here, when a trainer utters "Landing leg failure" that matches the voice content of the input voice setting field 33 of the input form 30, the CPU 16 causes processing to proceed to the output form 40 with the identification number "11" which is set as the proceeding destination of processing in the input voice setting field 33.

Next, the CPU 16 executes voice output processing in the output form 40 with the identification number "11", and outputs the voice "Roger" from the speaker 140, then causes processing to proceed to the action form 50 with the identification number "6". In the action form 50, "return by 3 steps" operation processing is executed on the route up to the present, and the CPU 16 causes processing to proceed back to the setting form 80 by 3 steps from the output form 40 with the identification number "11" which is the setting form 80 immediately before the action form 50. Then, processing proceeds to the interrupt setting form 60. However, in the interrupt setting form 60, interrupt processing is performed during execution of processing of the input form 30 with the identification number "1" which is to be originally performed, and thus the CPU 16 causes processing to proceed not to the interrupt setting form 60 itself but to the input form 30 with the identification number "1".

Effects

As described above, according to the present implementation, when a form generation button 20 displayed on the display 120 is operated, out of a plurality of types of setting forms 80 for setting a plurality of types of processing, a setting form 80 corresponding to the operated form generation button 20 is displayed in a training scenario. Also, when an operation is performed by a user to cause processing in the training scenario to proceed between the setting forms displayed on the display 120, a connection line L connecting between the operated setting forms 80 is displayed. Thus, a user displays a plurality of setting forms 80 on the display 120 and connects therebetween, and thereby a training scenario, in which processing corresponding to the setting forms 80 are connected, can be easily generated, and also the flow of the training scenario can be visually recognized easily. Therefore, in contrast to related art in which a training scenario is incorporated in a program, a training scenario for traffic control communication can be easily generated.

Also, the interrupt setting form 60 allows interrupt processing to be set during execution of processing in the input form 30, where the interrupt processing interrupts the processing and receives voice input, and thus a user can immediately correct, for instance, the last voice input and restate it. Eventually, it is possible to develop a training scenario flexibly.

In addition, the input form 30 and the output form 40 have the start button 35 and the start button 45 for starting execution of a training scenario from the input and output forms, and thus verification of the content of, for instance, a training scenario in process of generation can be made easily.

At the time of training scenario execution, the identification number of a setting form 80, for which processing is executed, is stored in the storage 15, and thus it is possible to recognize the route followed by a trainee in the training scenario, and proficiency of the trainee can be evaluated based on the degree of deviation from a model route, for instance.

It is to be noted that an implementation to which the present disclosure is applicable is not limited to the above-described implementation and may be modified as needed in a range without departing from the spirit of the present disclosure.

For instance, in the above-described implementation, the traffic control training apparatus 10 is provided for raining of air traffic control. However, the type of traffic control communication to which the present disclosure is applicable is not limited to air traffic control communication, and may be, for instance, marine traffic control communication between a vessel and a marine traffic control center, or communication between a train and a train control center.

Also, the traffic control training apparatus 10 may be operated in conjunction with a flight simulator that simulates flight control of an airplane. In this case, for instance, a function such as "communication with an external application" may be implemented in the action form 50, and exchange of information may be performed with the flight simulator under predetermined conditions. In this configuration, a trainee can receive training of comprehensive flight control of an airplane, including communication with an air traffic controller. It is to be noted that when a traffic control training apparatus according to the present disclosure is applied to another traffic type, the traffic control training apparatus may be operated in conjunction with a real-time simulator (for instance, a drive simulator or a railroad simulator) according to the traffic type.

In addition, each setting form 80 may be provided with a display unit that indicates processing is in operation, so that it can be easily determined that processing of which setting form 80 is in operation at the time of training scenario execution.

The invention claimed is:

1. A traffic control training scenario generation apparatus that generates a training scenario for traffic control communication, the traffic control training scenario generation apparatus comprising:
   a display;
   a processor; and
   a memory storing:
   (1) information for displaying:
      a first form generation button associated with a first setting form for setting a first process to be performed in the training scenario for traffic control communication, the first setting form including a first setting field for setting one or more reference voice input contents to be compared with one or more first voice input contents of a first voice input received from a trainee in the first process; and
      a second form generation button associated with a second setting form for setting a second process to be performed in the training scenario for traffic control communication, the second setting form including a second setting field for setting one or more voice output contents to be output in the second process in which at least one of the one or more voice output contents is output based on determining that at least one of the one or more first voice input contents matches at least one of the one or more reference voice input contents in the first process,
      wherein the second process is executed consecutively following executing the first process, and
   (2) instructions for generating the training scenario, when executed, causing the processor to:
      control the display to display the first and second form generation buttons;
      responsive to a selection of the first form generation button, control the display to display the first setting form including the first setting field;
      responsive to a selection of the second form generation button, control the display to display the second setting form including the second setting field; and
      responsive to an instruction of setting an order of performing the first process and the second process, control the display to display a connection line connecting the first setting form and the second setting form, wherein the first setting form, the first setting field, the second setting form, the second setting field, and the connection line are concurrently displayed on the display.

2. The traffic control training scenario generation apparatus according to claim 1, wherein the instructions for generating the training scenario, when executed, further causes the processor to
   control the display to display an interrupt setting form for setting a third process in the training scenario, the third process configured to, during execution of the first process, interrupt the first process based on determining that the one or more first voice input contents does not match the one or more reference voice input contents in the first process.

3. A traffic control training apparatus comprising:
   a traffic control training scenario generation apparatus that generates a training scenario for traffic control communication, the traffic control training scenario generation apparatus comprising:
      a display;
      a processor;
      a memory storing:
      (1) information for displaying (i) a first form generation button associated with a first setting form for setting a first process to be performed in the training scenario for traffic control communication, and (ii) a second form generation button associated with a second setting form for setting a second process to be performed in the training scenario,
      (2) instructions for generating the training scenario, when executed, causing the processor to:
         control the display to display the first form generation button and the second form generation button,
         responsive to a selection of the first form generation button, control the display to display the first setting form including a first setting field for setting one or more first reference voice input contents to be compared with one or more first voice input contents of a first voice input received from a trainee in the first process,
         responsive to a selection of the second form generation button, control the display to display the second setting form including a second setting field for setting one or more voice output contents to be output in the second process, and
         responsive to an instruction of setting an order of performing the first process and then the second process, associate the first setting form with the second setting form and control the display to display a connection line connecting the first setting form and the second setting, wherein the first setting form, the first setting field, the second setting form, the second setting field, and the connection line are concurrently displayed on the display; and
      (3) instructions for executing the training scenario, when executed, causing the processor to:
         execute the first process in which the one or more first voice input contents of the first voice input are received from the trainee,
         consecutively following executing the first process, execute the second process in which at least one of the one or more voice output contents is output based on determining that at least one of the one or more first voice input contents matches at least one of the one or more first reference voice input contents in the first process;
a voice input unit; and
a voice output unit.

4. The traffic control training apparatus according to claim 3,
wherein the instructions for generating the training scenario, when executed, further causes the processor to control the display to display an interrupt setting form for setting a third process to be performed in the training scenario, the interrupt setting form including a third setting field for setting one or more second reference voice input contents to be compared with the one or more first voice input contents of the first voice input received from the trainee in the first process, and
wherein the instructions for executing the training scenario, when executed, further causes the processor to:
execute the third process in which the first process is interrupted based on determining that (A) the one or more first voice input contents of the first voice input received from the trainee do not match the one or more first reference voice input contents, and (B) the at least one of the one or more first voice input contents of the first voice input received from the trainee matches at least one of the one or more second reference voice input contents.

5. The traffic control training apparatus according to claim 3, wherein the first setting form and the second setting form have respective start buttons to start execution of the training scenario from each of the first setting form and the second setting form.

6. The traffic control training apparatus according to claim 4, wherein the first setting form and the second setting form have respective start buttons to start execution of the training scenario from each of first setting form and the second setting form.

7. The traffic control training apparatus according to claim 3, further comprising a storage unit that stores an identification number of the respective first and second setting forms, wherein the first and second setting forms displayed on the display have mutually different identification numbers.

8. The traffic control training apparatus according to claim 4, further comprising a storage unit that stores an identification number of the respective first and second setting forms, wherein the first and second setting forms displayed on the display have mutually different identification numbers.

9. The traffic control training apparatus according to claim 5, further comprising a storage unit that stores an identification number of the respective first and second setting forms, wherein the first and second setting forms displayed on the display have mutually different identification numbers.

10. The traffic control training apparatus according to claim 6, further comprising a storage unit that stores an identification number of the respective first and second setting forms, wherein the first and second setting forms displayed on the display have mutually different identification numbers.

11. The traffic control training apparatus according to claim 3, wherein the traffic control training apparatus is operated in conjunction with a real-time simulator.

12. The traffic control training apparatus according to claim 4, wherein the traffic control training apparatus is operated in conjunction with a real-time simulator.

13. The traffic control training apparatus according to claim 5, wherein the traffic control training apparatus is operated in conjunction with a real-time simulator.

14. The traffic control training apparatus according to claim 6, wherein the traffic control training apparatus is operated in conjunction with a real-time simulator.

15. The traffic control training apparatus according to claim 7, wherein the traffic control training apparatus is operated in conjunction with a real-time simulator.

16. The traffic control training apparatus according to claim 8, wherein the traffic control training apparatus is operated in conjunction with a real-time simulator.

17. The traffic control training apparatus according to claim 9, wherein the traffic control training apparatus is operated in conjunction with a real-time simulator.

18. The traffic control training apparatus according to claim 10, wherein the traffic control training apparatus is operated in conjunction with a real-time simulator.

19. A non-transitory computer-readable medium containing instructions for executing a traffic control training scenario generation method for generating a training scenario for traffic control communication, the method comprising:
displaying first and second form generation buttons that respectively correspond to first and second setting forms, wherein the first and second setting forms respectively set first and second processes to be performed in the training scenario for the traffic control communication;
responsive to a selection of the first form generation button, generating the first setting form including a first setting field for setting one or more reference voice input contents compared with one or more voice input contents of a voice input received from a trainee in the first process, and displaying the first setting form in a scenario generation window;
responsive to a selection of the second form generation button, generating the second setting form including a second setting field for setting one or more voice output contents to be output in the second process, and displaying the second setting form in the scenario generation window; and
responsive to an instruction of setting an order of performing the first process and the second process, associating the first setting form with the second setting form, and displaying, in the scenario generation window, a connection line connecting the first setting form and the second setting form to allow the first process in which the one or more voice input contents are received from the trainee to be performed consecutively followed by the second process in which at least one of the one or more voice output contents is output based on determining that at least one of the one or more voice input contents of the voice input received from the trainee matches at least one of the one or more reference voice input contents set in the first process when the training scenario is executed, wherein the first setting form, the first setting field, the second setting form, the second setting field, and the connection line are concurrently displayed on the scenario generation window.

* * * * *